US009531046B2

(12) United States Patent
Inoue et al.

(10) Patent No.: US 9,531,046 B2
(45) Date of Patent: Dec. 27, 2016

(54) BATTERY PACK

(71) Applicant: DENSO CORPORATION, Kariya, Aichi-pref. (JP)

(72) Inventors: Yoshimitsu Inoue, Chiryu (JP); Hiroyoshi Yamamoto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/635,208

(22) Filed: Mar. 2, 2015

(65) Prior Publication Data
US 2015/0255838 A1    Sep. 10, 2015

(30) Foreign Application Priority Data

Mar. 6, 2014   (JP) ................. 2014-044245

(51) Int. Cl.
*H01M 2/10*     (2006.01)
*H01M 10/6565*  (2014.01)
*H01M 10/613*   (2014.01)
*H01M 10/625*   (2014.01)
*H01M 10/6566*  (2014.01)
*H01M 10/48*    (2006.01)
*H01M 10/63*    (2014.01)
*H01M 10/615*   (2014.01)
*H01M 10/6567*  (2014.01)
*H01M 10/42*    (2006.01)

(52) U.S. Cl.
CPC ....... *H01M 10/6565* (2015.04); *H01M 2/1077* (2013.01); *H01M 10/486* (2013.01); *H01M 10/613* (2015.04); *H01M 10/615* (2015.04); *H01M 10/625* (2015.04); *H01M 10/63* (2015.04); *H01M 10/6566* (2015.04); *H01M 10/6567* (2015.04); *H01M 2010/4271* (2013.01)

(58) Field of Classification Search
CPC ............ H01M 10/6565; H01M 2/1077; H01M 10/613; H01M 10/625; H01M 10/6567; H01M 10/486; H01M 2010/4271; H01M 10/63
See application file for complete search history.

(56) References Cited

U.S. PATENT DOCUMENTS

2013/0330577 A1*  12/2013 Kristofek ............ H01M 2/1077
                                                            429/50
2015/0037646 A1*  2/2015 Wyatt ............... H01M 10/6551
                                                           429/120

FOREIGN PATENT DOCUMENTS

JP     2007-329047     12/2007
JP     2013-26116      2/2013
JP     2015-46321      3/2015

* cited by examiner

*Primary Examiner* — Emily Le
*Assistant Examiner* — Monique Wills
(74) *Attorney, Agent, or Firm* — Nixon & Vanderhye PC

(57) ABSTRACT

A battery pack has a casing, electric fans, battery temperature thermistors and a battery management unit. The casing accommodates the battery cell stacks. The electric fans generate an air circulation in the inside chamber of the casing. The thermistors detect a temperature of the battery cells. At least one of the thermistors is arranged in each of the battery cell stack to detect a temperature of a battery cell arranged at a specific location in a battery cell stacking direction. At least one of the thermistors arranged in one battery cell stack in a pair of the battery cell stacks selected from all of the battery cell stacks detects a temperature of the battery cell arranged at a different location in the battery cell stacking direction from a location of any battery cell arranged in the other battery cell stack in the pair of the battery cell stacks.

9 Claims, 6 Drawing Sheets

BATTERY PACK

CROSS-REFERENCE TO RELATED APPLICATION

This application is related to and claims priority from Japanese Patent Application No. 2014-44245 filed on Mar. 6, 2014, the contents of which are hereby incorporated by reference.

BACKGROUND OF THE INVENTION

1. Field of the Invention

The present invention relates to battery packs such as electric vehicle (EV) battery packs in which a casing accommodates a plurality of battery cells.

2. Description of the Related Art

For example, a Japanese patent laid open publication No. JP 2007-329047 has disclosed a battery pack having a conventional structure equipped with a battery pack casing. The battery pack casing accommodates a plurality of battery cell stacks. In each of the battery cell stacks, a plurality of battery cells is stacked in a specific direction. The battery pack casing has an inlet section and an outlet section or a discharge section. Outside air is introduced into an inside chamber of the battery pack casing through the inlet section. The air flows in the gaps formed between the battery cells in the battery pack casing. The inside air is discharged outside through the outlet section of the battery pack casing. That is, after heat-exchange of the air in the battery pack casing, the air is discharged outside from the battery pack through the outlet section. In other words, the heat-exchanged air is not recirculated in the inside chamber of the battery pack casing, and discharged outside through the outlet section of the battery pack casing. Further, a fresh air is introduced into the inside of the battery pack casing. In the structure of the battery pack previously described, the air flowing in the battery pack casing and fresh air introduced into the battery pack casing do not have a uniform temperature distribution (or a uniform temperature variation). Accordingly, a plurality of temperature detection devices and wires is necessary in the battery pack having such a conventional structure in order to detect a correct temperature of the battery cells and transmit detection signals to an outside control unit through the temperature detection wires.

However, in the battery pack having the conventional structure disclosed in the Japanese patent laid open publication No. JP 2007-329047, because the battery cells are cooled by the inside air flowing in the inside of the battery pack casing and the inside air is discharged outside through the outlet section, the temperature detection wires prevent a smooth flowing of the inside air in the battery pack casing. As a result, this provides an adverse influence on the battery cooling characteristics of the battery pack.

For example, when a vehicle such as a hybrid vehicle or an electric vehicle is equipped with a battery pack having a plurality of battery cells, it is necessary to have a plurality of temperature detection devices such as battery temperature thermistors capable of detecting a battery temperature of each of the battery cells, a plurality of temperature detection wires, and a control device such as a battery management unit equipped with a plurality of input ports. This increases the number of components of the battery pack mounted on the vehicle and the total manufacturing cost of the vehicle.

SUMMARY

It is therefore desired to provide a battery pack having a plurality of battery cells capable of estimating a correct temperature of the battery cells accommodated in a battery pack casing with the reduced number of temperature detection devices and wires.

An exemplary embodiment provides a battery pack having a plurality of battery cell stacks, a battery pack casing, a fluid drive section, temperature detection devices, and a battery management section. The battery cell stacks are arranged in a battery cell stack arrangement direction. A plurality of battery cells in each of the battery cell stacks are stacked in a battery cell stacking direction. The battery pack casing accommodates the battery cell stacks. The fluid drive section generates and circulates a fluid circulation in an inside chamber of the battery pack casing. The fluid circulation cools or heats the battery cells. The temperature detection devices detect a temperature of the battery cells. At least one of the temperature detection devices is arranged in each of the battery cell stacks. The battery management section receives temperature information detected by the temperature detection devices. In the battery pack, when a first battery cell stack and a second battery cell stack are selected form the plural battery cell stacks arranged in the battery cell stack arrangement direction, at least one of the temperature detection devices arranged on a battery cell belonging to the first battery cell stack detects a temperature of a battery cell, on which no temperature detection device is arranged, in the second battery cell stack.

In the structure of the battery pack according to an exemplary embodiment, the temperature detection devices arranged in a pair of the battery cell stacks selected from all of the battery cell stacks detect a temperature of the battery cells arranged at a different location in the battery cell stacking direction. That is, the pair of the battery cell stacks has a different location at which the temperature detection devices such as the battery temperature thermistors are arranged in the battery cell stacking direction. Accordingly, a battery cell arranged in one battery cell stack in the pair of the battery cell stacks is arranged at a different location in the battery cell stacking direction from the battery cell arranged in the other battery cell stack in the pair of the battery cell stacks.

Because the fluid circulation such as air is generated in the inside chamber of the battery pack casing by the fluid drive section such as one or more electric fans, it is possible for the battery management unit to receive and monitor temperature information detected by and transmitted from the temperature detection device in one battery cell stack, and estimates a temperature of the battery cell arranged in the other battery cell stack in the pair of the battery cell stacks on the basis of the received temperature information. That is, it is possible for the battery management unit to estimate that the battery cells in the pair of the battery cell stacks have a same temperature value. This structure makes it possible to decrease the total number of the temperature detection devices in the battery packs. It is not necessary to arrange a temperature detection device in each of the battery cells. This structure decreases the total number of components necessary to produce the battery pack, and produces the battery pack with a low manufacturing cost. The battery pack according to the present invention can detect and estimate a correct temperature of the battery cells arranged in the battery assembly stored in the battery pack casing with high efficiency.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams. Through the following first to third exemplary embodiments, the same components will be referred with the same reference numbers and characters.

First Exemplary Embodiment

A description will now be given of a battery pack 1 according to a first exemplary embodiment with reference to FIG. 1 to FIG. 4.

Figure 1:
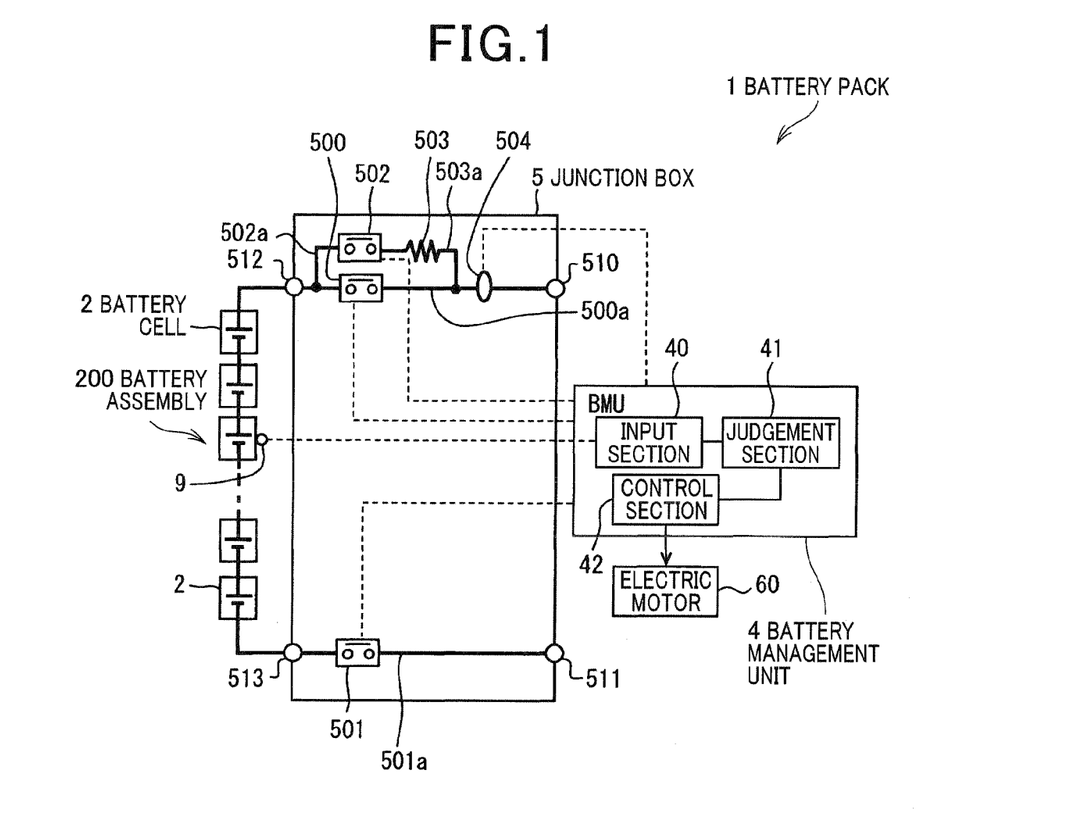
FIG. 1 is a view showing an overall structure of a battery pack according to a first exemplary embodiment capable of detecting a temperature of battery cells arranged in battery cell stacks.

FIG. 1 is a view showing an overall structure of the battery pack 1 according to the first exemplary embodiment capable of detecting a temperature of battery cells 2 arranged in battery cell stacks 20, 21, 22 and 23 accommodated in a battery pack casing 3. The battery pack 1 basically has a battery assembly 200, a junction box 5 and a battery management unit 4, and the battery pack casing 3.

As show in FIG. 1, the battery pack 1 is comprised of the battery assembly 200, the junction box 5, the battery management unit 4, and the battery pack casing 3. The battery pack 1 is used in various types of vehicles such as hybrid vehicles and electric vehicles. A hybrid vehicle is equipped with two or more distinct power sources, for example, an internal combustion engine and a motor generator as a drive motor. An electric vehicle is equipped with a motor generator as a drive motor, for example.

The battery pack 1 has a plurality of battery cells 2 such as nickel hydrogen rechargeable batteries, lithium ion rechargeable batteries and organic radical rechargeable batteries.

The battery pack 1 is equipped with the battery assembly 200, the battery pack casing 3 and a fluid drive section. The battery assembly 200 is composed of a plurality of battery cell stacks 20, 21, 22 and 23, etc. The battery pack casing 3 accommodates the battery assembly 200. The fluid drive section circulates a fluid, i.e. a fluid circulation, for example, air circulation circulated in the inside chamber of the battery pack casing 3.

Figure 4:
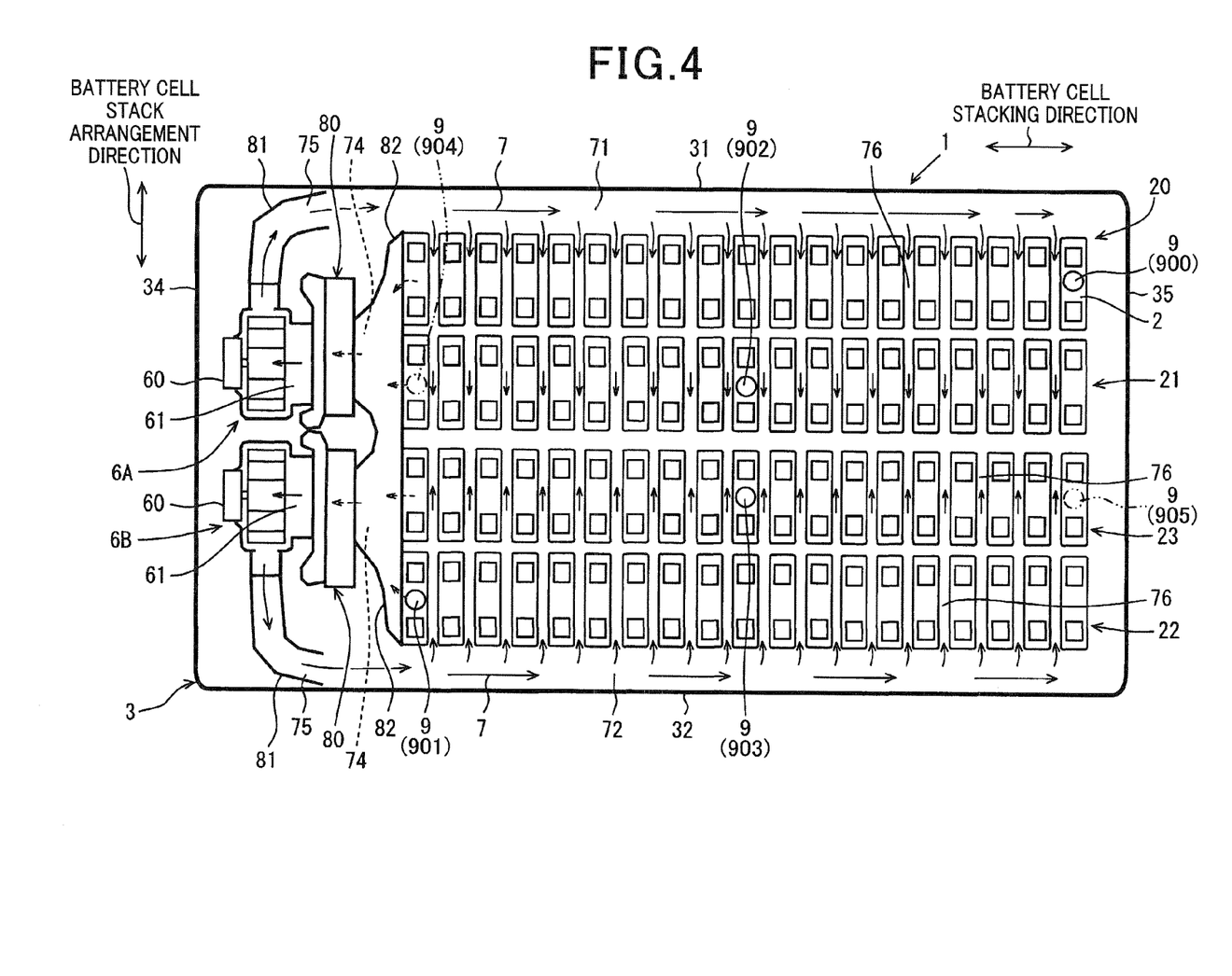
FIG. 4 is a view showing the inside structure viewed from a ceiling wall side of the battery pack casing and the fluid circulation flowing in the inside of the battery pack casing of the battery pack according to the first exemplary embodiment of the present invention.

The battery assembly 200 is a combination composed of four battery cell stacks 20, 21, 22 and 23. Each of the four battery cell stacks 20, 21, 22 and 23 is an assembly of battery cells 2 which are stacked along a battery cell stacking direction. As shown in FIG. 4, the four battery cell stacks 20, 21, 22 and 23 are arranged in a battery cell stack arrangement direction which is perpendicular to the battery cell stacking direction. The battery assembly 200 is therefore composed of the four battery cell stacks 20, 21, 22 and 23 arranged in the four columns.

The battery pack casing 3 accommodates the four battery cell stacks 20, 21, 22 and 23 and a fluid drive section 6. The fluid drive section 6 is composed of electric fans 6A and 6B. The electric fans 6A and 6B are arranged in the battery cell stack arrangement direction in the battery pack casing 3.

An exterior casing accommodates each of the battery cells 2 and is equipped with a positive electrode terminal and a negative electrode terminal. The positive electrode terminal and the negative electrode terminal are projected outside from the exterior casing of each battery cell 2. Different electrode terminals having a different polarity between the battery cells 2 which are adjacent to each other are electrically connected to each other by a conductive member such as a bus bar. For example, each of the electrode terminals and the bus bars are connected together by using screws or welding.

Accordingly, electric power is supplied to the battery cells 2 through the global end terminals (a global positive electrode terminal and a global negative electrode terminal) of the battery cells 2, and the battery cells 2 supply electric power to outside devices.

The battery assembly 200 has electric components electrically collected to the four battery cell stacks 20, 21, 22 and 23. The electric components adjust a current flow in the battery cells 2 arranged in the four battery cell stacks 20, 21, 22 and 23. FIG. 1 shows the electric components which are connected through the conductive wires. For example, the electric components contain various types of relay devices, a pre-charge resistance 503, and a current sensor 504.

The relay devices are capable of controlling a current flow in the battery assembly 200. A junction box 5 is a relay device which is equipped with a positive electrode main relay 500 at the positive electrode side, a negative electrode main relay 501 at the negative electrode side, a pre-charge relay 502, the pre-charge resistance 503, a current sensor 504, etc. Each of the electric components such as the positive electrode main relay 500, the negative electrode main relay 501, the pre-charge relay 502, the pre-charge resistance 503, the current sensor 504 controls a current flow. When receiving a current, each of the positive electrode main relay 500, the negative electrode main relay 501, the pre-charge relay 502, the pre-charge resistance 503, the current sensor 504 generates heat energy and radiates the heat energy outside.

The positive electrode main relay 500, the negative electrode main relay 501, the pre-charge relay 502, the pre-charge resistance 503, the current sensor 504 are electrically connected to the battery cells 2. Further, a positive electrode output terminal 510 at the positive electrode side, a positive electrode input terminal 512 at the positive electrode side, a negative electrode output terminal 511 at the negative electrode side, a negative electrode input terminal 513 at the negative electrode side are electrically connected to the battery cells 2.

As shown in FIG. 1, the positive electrode output terminal 510 is arranged at the positive electrode side of the battery assembly 200 composed of the battery cells 2 and connected to an inverter. The negative electrode output terminal 511 is arranged at the negative electrode side of the battery assembly 200 and connected to the inverter. The positive electrode input terminal 512 is a connection terminal through which the positive electrode of the battery assembly 200 is connected to the junction box 5. The negative electrode input terminal 513 is a connection terminal through which the negative electrode terminal of the battery assembly 200 is connected to the junction box 5.

The main relay 501 is connected to the global negative electrode terminal of the battery assembly 200 through the bus bar. The main battery 501 is connected to the output terminal through another bus bar. The pre-charge relay 502 and the pre-charge resistance 503 are connected in series by conductive wires. The pre-charge relay 502 and the pre-charge resistance 503 are connected parallel to the main relay 500 through conductive wires 502a and 503a.

A connection node between the positive electrode main relay 500 and the pre-charge relay 502 is connected to the global positive electrode terminal by the bus bar or a conductive cable. The positive electrode main relay 500 and the pre-charge resistance 503 are connected together by a bus bar and a conductive cable.

The electric components previously described are electrically connected together by the bus bars, the conductive wires and the conductive cables. The entire of the battery cells 2 in the battery assembly 200 enters the conductive state when the positive electrode main relay 500 and the negative electrode main relay 501 are turned on. On the other hand, the entire of the battery cells 2 in the battery assembly 200 enters the non-conductive state when the positive electrode main relay 500 and the negative electrode main relay 501 are turned off.

The positive electrode main relay 500 and the negative electrode main relay 501 are relays capable of turning on the battery assembly 200 which outputs electric power.

The positive electrode main relay 500, the negative electrode main relay 501, the pre-charge relay 502 and the pre-charge resistance 503 generate heat energy when receiving electric power, and the conductive wires and cables connected to these relays 500, 501, 502 and 503 generate heat energy.

The battery management unit 4 is a battery control device capable of managing at least two parameters of the battery cells 2, that is, a state of charge (SOC) of each of the battery cells 2 and a temperature of the battery cells 2. The SOC is the equivalent of a fuel gauge for the battery pack in a battery electric vehicle (BEV), hybrid vehicle (HEV), or plug-in hybrid electric vehicle (PHEV). The units of SOC are percentage points, SOC of 0% indicates empty and SOC of 100% indicates full.

The battery management unit 4 receives a detection signal indicating temperature information of the battery cells 2 transmitted from a temperature detection device 9.

The battery management unit 4 further manages a current, a voltage, etc. of each of the battery cells 2. The battery management unit 4 detects occurrence of an abnormal state of each of the battery cells 2 and a leakage current from the battery cells 2. Still further, the battery management unit 4 initiates, adjusts and stops the operation of an electric motor 60 of the fluid drive section 6.

The battery management unit 4 further acts as a control unit capable of managing the operation of each of the positive electrode main relay 500, the negative electrode main relay 501 and the pre-charge relay 502. That is, the battery management unit 4 switches to the turned-on state and the turned-off state of each of the positive electrode main relay 500, the negative electrode main relay 501 and the pre-charge relay 502.

The several temperature detection devices 9 are mounted on the battery pack 1 according to the first exemplary embodiment. Each of the temperature detection devices 9 is a battery temperature thermistor capable of detecting a battery temperature.

Each of the battery temperature thermistors are connected to the battery management unit 4 through temperature detection wires. Each of the battery temperature thermistors transmits a temperature detection signal to the battery management unit 4. Each of the battery temperature thermistors detects a temperature of the battery cells arranged at a predetermined location in the battery assembly 200. For example, the battery temperature thermistors 900, 901, 902 and 903, and other components form a temperature management device in the battery pack 1.

The battery management unit 4 is equipped with an input section 40 which receives a temperature detection signal detected by and transmitted from each of the battery temperature thermistors 900, 901, 902 and 903, a current detection signal detected by and transmitted from the current sensor 504, and a voltage detection signal detected by and transmitted from a voltage detection sensor.

The battery management unit 4 has a judgment section 41 capable of performing a predetermined judgment process by using various information on the basis of the input detection signals of the input section 40, the calculation programs and a control characteristic map. The battery management unit 4 further has a control section 42 capable of initiating and stopping the operation of the electric motor 60, and determining an output amount of the electric motor 60 on the basis of the judgment result transmitted from the judgment section 41. The control section 42 adjusts the operation of the electric motor on the basis of the judgment result of the judgment section 41.

The battery management unit 4 is equipped with an input circuit, a microcomputer and an output circuit. The input circuit forms the input section 40. The microcomputer forms the judgment section 41 and the control section 42. The output circuit forms a communication section which communicates with the control section 42 and other control devices. The microcomputer has a memory section capable of storing information regarding the battery cells 2. For example, the battery information stored in the memory section contain information regarding battery voltage, charging current, discharging current and battery temperature, judgment result of the judgment section 41 and control data of the control section 42. The battery management unit 4 is configured to communicate with various electronic control devices such as a vehicle engine control unit (ECU).

Figure 2:
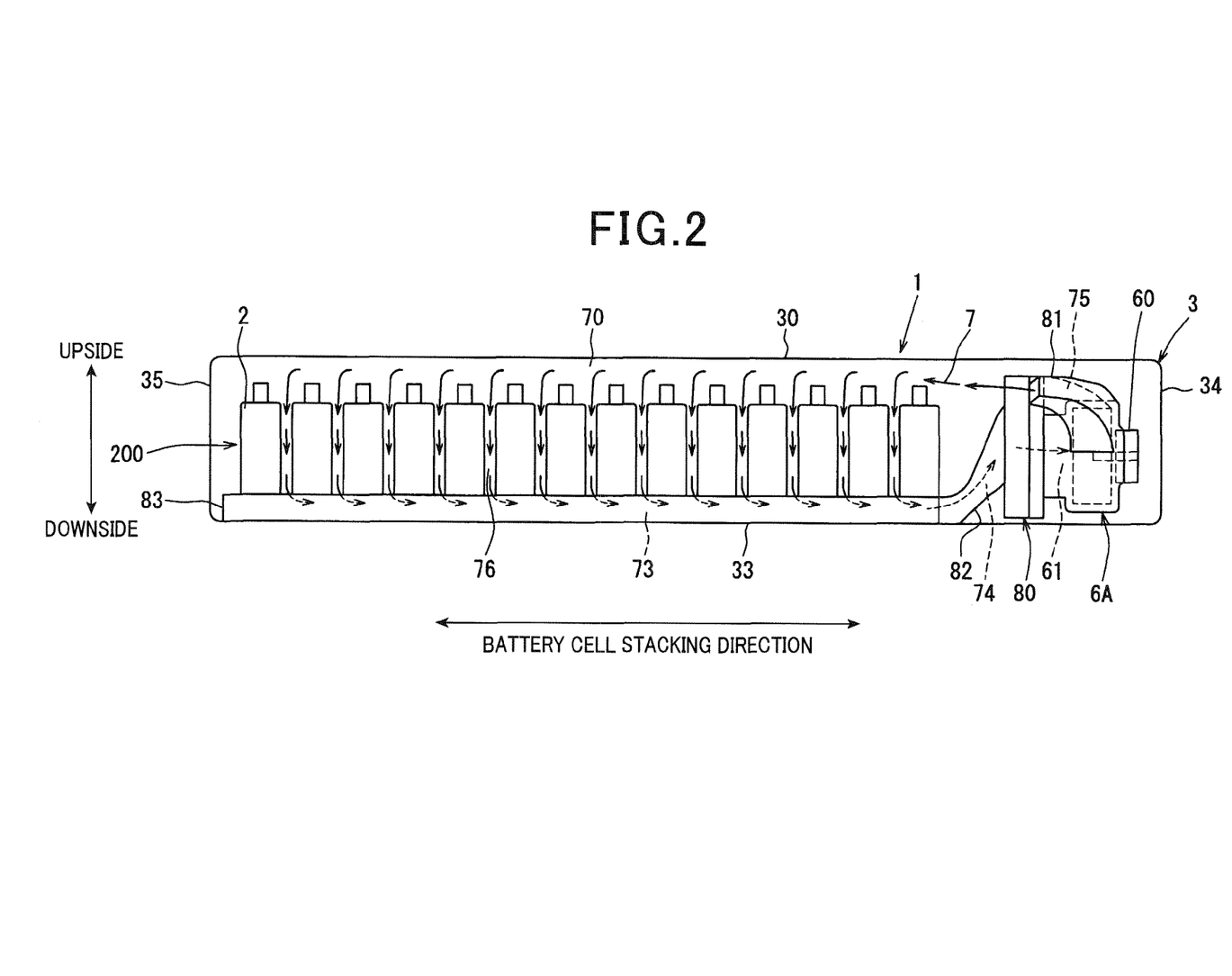
FIG. 2 is a view showing an inside structure viewed from one side wall and a fluid circulation flow in the inside chamber of a battery pack casing in the battery pack according to the first exemplary embodiment of the present invention.
Figure 3:
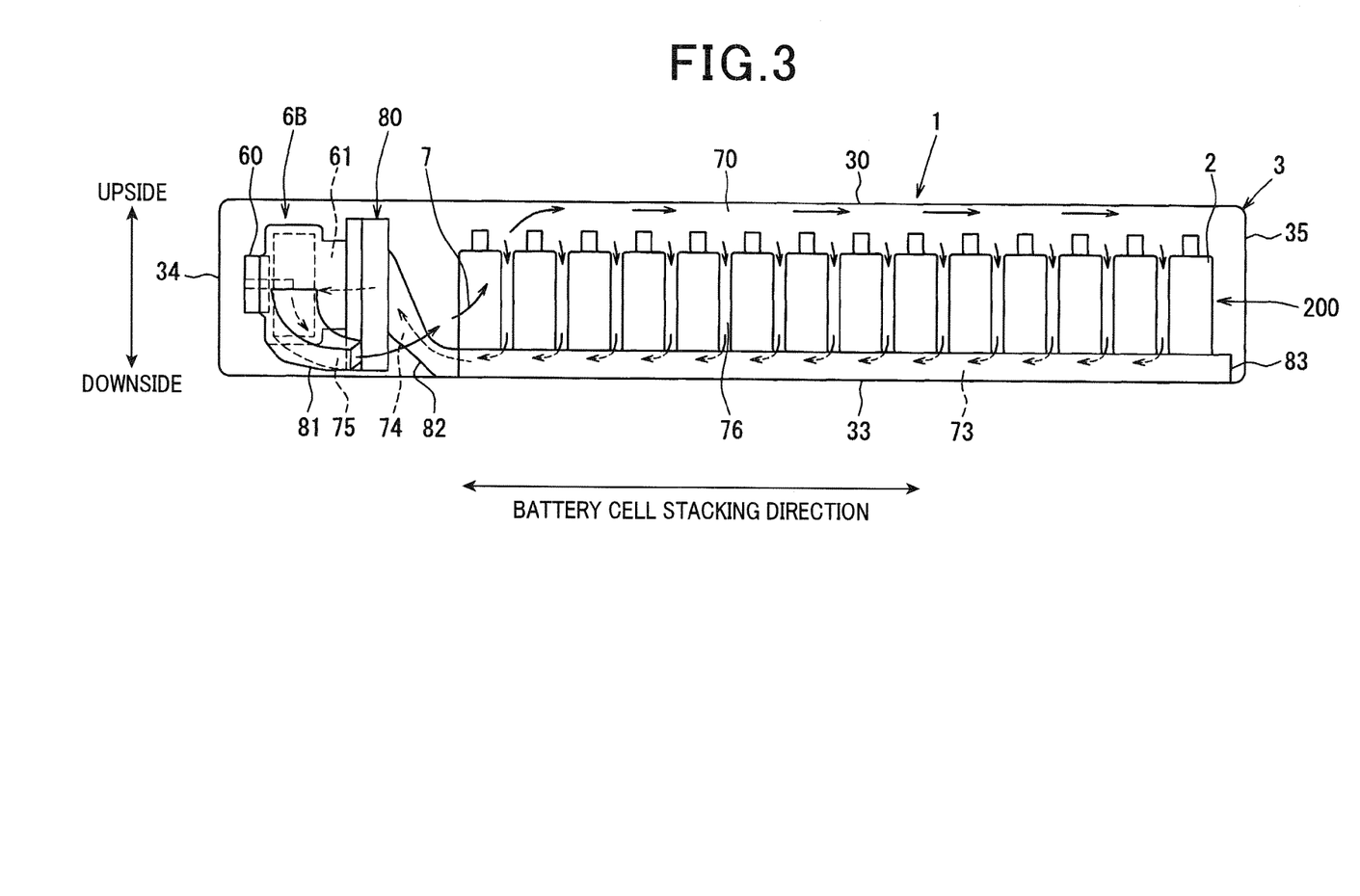
FIG. 3 is a view showing the inside structure viewed from the other side wall and the fluid circulation flow in the inside chamber of the battery pack casing in the battery pack according to the first exemplary embodiment of the present invention.

FIG. 2 is a view showing an inside structure viewed from one side wall and a flow of a fluid circulation such as air in the inside chamber of the battery pack casing 3 of the battery pack 1 according to the first exemplary embodiment. FIG. 3 is a view showing the inside structure viewed from the other side wall and the flow of the fluid circulation in the inside chamber of the battery pack casing 3 of the battery pack 1 according to the first exemplary embodiment. FIG. 4 is a view showing the inside structure viewed from a ceiling wall 30 side of the battery pack casing 3 and the fluid circulation flowing in the inside chamber of the battery pack casing 3 of the battery pack 1 according to the first exemplary embodiment.

As shown in FIG. 2, FIG. 3 and FIG. 4, a circulation passage 7 is formed in the inside of the battery pack casing 3 through which the fluid circulation such as air circulation is forcedly circulated by the electric fans 6A and 6B. In the fluid circulation passage 7 formed in the inside of the battery pack casing 3, heat exchange occurs between the battery cells 2 and the fluid (for example, air) forcedly blown by the electric fans 6A and 6B. After the heat exchange, the air is circulated in the fluid circulation passage 7 and the electric fans 6A and 6B suck the fluid circulation. Thus, the fluid circulation is recirculated in the fluid circulation passage 7. As shown in FIG. 2, FIG. 3 and FIG. 4, the fluid circulation such as air circulation passed through the fluid circulation passage 7 is sucked only by one air inlet section in each of the electric fans 6A and 6B, and the sucked fluid is discharged from one air outlet section of each of the electric fans 6A and 6B. Accordingly, the fluid circulation such as air circulation which is circulated in the fluid circulation passage 7 formed in the inside of the battery pack casing 3 always flows in the fluid circulation passage 7 through the electric fans 6A and 6B.

The battery pack casing 3 has a box shape having the side walls, the ceiling wall and the base wall which surround the interior chamber of the battery pack casing 3. The battery pack casing 3 is made of an aluminum plate or an iron plate which is a molded product. The battery pack casing 3 has at least six walls such as side walls 31, 32, 34 and 35, the ceiling wall 30 and the base wall 33. The side walls 31 and 32 face to each other. Similarly, the side walls 34 and 35 face to each other. The side walls 31, 32, 34 and 35 are arranged in a direction which is perpendicular to the direction of the ceiling wall 30 and the base wall 33.

It is also possible to assemble a plurality of casings in order to form a chamber having a box shape. In addition, it is preferable to form a plurality of projected sections or depressed sections on one or more side walls of the battery pack casing 3 to increase a radiation area.

As shown in FIG. 2 and FIG. 4, the fluid circulation passage 7 is formed by a series fluid passage composed of a fluid inlet passage 74, a fluid outlet passage 75, a ceiling wall passage 70, battery cell passages 76 and an assembly passage 73.

The battery cells 2 accommodated in the battery pack casing 3 are arranged to form a plurality of the battery cell stacks 20, 21, 22 and 23. The battery cells 2 forming the battery cell stack are arranged at predetermined intervals in the chamber formed in the inside of the battery pack casing 3. The battery cell passage 76 is formed between the battery cells 2 which are adjacent to each other in each battery cell stack. The battery cell passage 76 is formed by a spacer member arranged between the battery cells 2 adjacent to each other. The spacer member is supported by the battery cells 2 adjacent to each other in order to form the battery cell passage. The fluid circulation such as air circulation flows through the battery cell passages 76 in the direction which is perpendicular to the battery cell stack direction. That is, the battery cell passage 76, formed between the battery cells 2 which are adjacent to each other, has an open section toward the direction of the ceiling wall passage 70. The battery cell passage 76 is near the side walls 31 and 32. The battery cell passage 76 communicates with an assembly duct 83 at the base wall 33 side. The battery cell passages 76 has a fluid inlet section at the ceiling wall 30 side and a fluid outlet section at the base wall 33 side.

The assembly duct 83 connects the end section of each battery cell 2 at the downstream side of the air circulation flow with the fluid inlet passage 74 in a fluid inlet duct 82. The assembly duct 83 forms the assembly passage 73 at which the air flowing from each battery cell passage 76 is thermally connected with the base wall 33. In other words, the heat energy of the fluid circulation is conducted to the base section 33 while the fluid circulation is passing through the assembly passage 73.

The assembly passage 73 is formed parallel to and along the base wall 33 from the outlet section of each battery cell passage 76 to the fluid inlet passage 74. The assembly passage 73 communicates with a fluid inlet section 61 of each of the electric fans 6A and 6B through the fluid inlet duct 82 and a connection member.

The ceiling wall passage 70 is formed extending parallel to and along the ceiling wall 30 in the section between the ceiling wall 70 and the battery cells 2. A side wall passage 71 is extended parallel to the side wall 31 which is perpendicular to the ceiling wall 30 and the base wall 33. As shown in FIG. 1, the side wall passage 71 is formed between the battery cells 2 and the side wall 31. A side wall passage 72 is extended parallel to the side wall 32 which faces the side wall 31 through the battery cell stacks 20, 21, 22 and 23 and is perpendicular to the ceiling wall 30 and the base wall 33. As shown in FIG. 1, the side wall passage 72 is also formed in a section between the battery cells 2 and the side wall 32.

The electric fans 6A and 6B are the fluid drive section capable of circulating the fluid in the inside of the battery pack casing 3. For example, the fluid is one selected from air, various types of gases, water, a coolant, etc.

Each of the electric fans 6A and 6B is comprised of an electric motor 60, a sirocco fan which is driven by the electric motor 60, and a fan casing which accommodates the sirocco fan. The fan casing has the fluid inlet section 61 through which the fluid is introduced. The fluid inlet section 61 communicates with the fluid inlet passage 74 in the fluid inlet duct 82 through a duct connection member 80. The duct connection member 80 is an attachment which connects the fan casing with the fluid inlet duct 82. Because a chamber is formed in the duct connection member 80 having a rectangular parallelepiped shape in each of the electric fans 6A and 6B, the presence of the duct connection member 80 can decrease a fluid resistance of the fluid circulation in the inside of the battery pack casing 3.

The rotary axis of each of the electric fans 6A and 6B is arranged along the ceiling wall 30 and the base wall 33 in order to suck the fluid circulation along the direction of the rotary axis of the electric fans 6A and 6B, and blow the sucked air to the centrifugal direction of the electric fans 6A and 6B. Each of the electric fans 6A and 6B is arranged so that the electric motor 60 faces the side wall 34 of the battery pack casing 3, that is, a back surface (at the electric motor 60 side) which is opposite to the fluid inlet section 61 faces the side wall 34 of the battery pack casing 3.

As shown in FIG. 1, the junction box 5 and the battery management unit 4 are arranged in the inside of the battery pack 1. The junction box 5 and the battery management unit 4 are in contact with the fluid circulation such as air circulation in the inside of the battery pack casing 3. Accordingly, the fluid circulation cools both the junction box 5 and the battery management unit 4.

The fluid outlet section of the fan casing is connected to a fluid outlet duct 81 which forms the fluid outlet passage 75. The fluid outlet passage 75 is a part of the fluid circulation passage 7.

As shown in FIG. 4, the fluid outlet passage 75 of the electric fan 6A extends in a centrifugal direction of the electric fan 6A along the ceiling wall 30 and the side wall 31. Accordingly, the fluid discharged from the fluid outlet passage 75 by the electric fan 6A progresses to the side wall 35 through the upper side of the side wall passage 71 along the ceiling wall 30 and the side wall 31. This fluid further flows toward the central section from the overall upper side of the side wall passage 71 through the ceiling wall passage 70. The fluid circulation flows through each of the battery cell passages 76 by the sucking power of the electric fan 6A, and flows at the downstream side of each of the battery cells 2 and introduced into the assembly passage 73 from the bottom side of each of the battery cell passages 76. Further, the fluid circulation is always returned to the electric fan 6A from the fluid inlet passage 74 and the fluid inlet section 61 of the electric fan 6A.

Still further, as shown in FIG. 4, the fluid outlet passage 75 of the electric fan 6B extends in a centrifugal direction of the electric fan 6B along the base wall 33 and the side wall 32. Accordingly, the fluid discharged from the fluid outlet passage 75 by the electric fan 6B progresses to the side wall 35 through the bottom section or the central section of the side wall passage 72 along the base wall 33 and the side wall 32. This fluid then flows toward the central section from the overall side of the side wall passage 72. The fluid circulation flows through each of the battery cell passages 76 by the sucking power of the electric fan 6B, and flows at the downstream side of each of the battery cells 2 and is introduced into the assembly passage 73 from the bottom side of each of the battery cell passages 76 formed between the adjacent battery cells 2. Further, the fluid circulation is always returned to the electric fan 6B from the fluid inlet passage 74 and the fluid inlet section 61 of the electric fan 6B.

As previously explained, the battery pack 1 has the arrangement structure comprised of the fluid inlet sections 61 and the fluid outlet sections 75 of the electric fans 6A and 6B and the battery cells 2. This arrangement structure makes it possible to generate the uniform fluid circulation in the inside chamber of the battery pack casing 3. In other words, the fluid circulation is generated in the inside chamber of the battery pack casing 3 by using the fluid only in the inside chamber so that the flow of the fluid circulation is formed symmetrically with respect to the battery cell stack arrangement direction along which the battery cell stacks 20, 21, 22 and 23 are arranged. That is, the flow of the fluid circulation flowing in the inside of the battery pack casing 3 has line symmetry along a central line between the battery cell stack 21 and the battery cell stack 23 along the battery cell stacking direction along which the battery cells 2 are stacked in each of the battery cell stacks 20, 21, 22 and 23.

As designated by the arrows shown in FIG. 4, the battery pack casing 3 is divided into two flow sections, i.e. the first flow section is formed at the side wall 31 side and the second section is formed at the side wall 32 side by a central line formed between the battery cell stack 21 and the battery cell stack 23. In other words, the flow of the fluid circulation is divided into the first fluid circulation and the second fluid circulation which are generated by the inside circulation flow only, not containing any outside air. The first fluid circulation flows in the first flow section at the side wall 31 side and the second fluid circulation flows in the second flow section at the side wall 32 side. This improved arrangement structure shown in FIG. 4 makes it possible for the battery cell stack 20 close to the side wall 31 and the battery cell stack 22 close to the side wall 32 to have the same temperature distribution (or the same temperature variation) of the battery cells 2. Similarly, the battery cell stack 21 arranged adjacent to the battery cell stack 20 and the battery cell stack 23 arranged adjacent to the battery cell stack 22 have the same temperature distribution of the battery cells 2.

Further, the fluid circulation flowing in the circulation passage 7 absorbs heat energy from the battery cells 2 or heats the battery cells 2 when the fluid circulation flows in each of the battery cell passages 76. After absorbing heat energy from the battery cell 2 or heating the battery cells 2, the fluid circulation is gathered into the assembly passage 73. The electric fans 6A and 6B suck the fluid circulation from the assembly passage 73 through the fluid inlet passage 74 and the fluid inlet sections 61.

Furthermore, because the fluid circulation is in contact with the electrode terminals of each battery cell 2, i.e. the positive electrode terminal, the negative electrode terminal and the bus bars which connects the electrode terminals having a different polarity of the adjacent battery cells 2 when the fluid circulation is flowing in the inside of the battery pack casing 3, the electrode terminals and the bus bars form heat transfer sections.

The battery cell 2 generates heat energy when the battery cell 2 outputs a current and is charged. The battery management unit 4 always monitors a temperature of the battery cells 2 arranged in the battery pack 1 and adjusts the operation of each of the electric fans 6A and 6B on the basis of the temperature detection results. In order to adjust a rotation speed of each of the electric fans 6A and 6B, a control section 42 in the battery management unit 4 determines a voltage having an optional duty ratio which is within a range of 0% to 100% of a maximum voltage of a power source (not shown). The battery management unit 4 supplies the determined voltage to each of the electric fans 6A and 6B in order to adjust the rotation speed thereof.

The battery pack 1 adjusts in multiple stages or continuously the fluid flow amount (such as an air flow amount) of the electric fans 6A and 6B on the basis of the determined voltage having the optional duty ratio.

A description will now be given of an optimum location of the temperature detection devices 9 in the battery assembly 200 comprised of the battery cell stacks 20, 21, 22 and 23 with reference to FIG. 4.

As shown in FIG. 4, the temperature detection device 9 has six battery temperature thermistors 900 to 905 arranged at the optimum locations in the battery cell stacks 20, 21, 22 and 23. In more detail, the battery temperature thermistor 900 is arranged at a location of closest to the side wall 35 and most far from the fluid outlet passage 75 of the electric fan 6A.

The battery temperature thermistor 901 is arranged at the battery cell 2 in the battery cell stack 22 which is closest to the side wall 34 or the fluid outlet passage 75 of the electric fan 6B. The battery cell stack 22 is located along the battery cell stack arrangement direction in line symmetry (along the battery cell stacking direction) with respect to the battery ell stack 20.

As shown in FIG. 4, the battery temperature thermistor 902 is arranged at the battery cell 2 located at the central location in the battery cell stack 21 along the battery cell stack arrangement direction. The battery temperature thermistor 903 is arranged at the battery cell 2 located at the central location of the battery cell stack 23 which is adjacent to the battery cell 2 in the battery cell stack 21 at which the battery temperature thermistor 902 is arranged.

It is preferable to arrange the battery temperature thermistor 904, in the battery cell stack 21, at the battery cell 2 which is closest to the side wall 34 or the fluid outlet passage 75 of the electric fan 6A.

Furthermore, it is preferable to arrange the battery temperature thermistor 905, in the battery cell stack 23, at the battery cell 2 which is closest to the side wall 35 or most far from the fluid outlet passage 75 of the electric fan 6B.

As previously explained and shown in FIG. 4, according to the structure of the battery pack 1 according to the first exemplary embodiment, the battery temperature thermistor as the temperature detection device 9 is not always arranged at each of the battery cells 2 in each of the battery cell stacks 20, 21, 22 and 23. Accordingly, in the structure of the battery assembly 200 comprised of the battery cell stacks 20, 21, 22 and 23, the battery temperature thermistor 900 as the temperature detection device 9 (the battery temperature thermistor 900) arranged in the battery cell stack 20 detects a temperature of the battery cell 2 arranged in the battery cell stack 20 which is a different location from the location of the battery cell 2 to be detected by the temperature detection device 9 (the battery temperature thermistor 901) arranged in the battery cell stack 22.

The battery cell stack 22 is located in line symmetry with respect to the battery cell stack 20 in the battery cell stack arrangement direction.

In addition, as shown in FIG. 4, the battery temperature thermistor 902 (as the temperature detection device 9) arranged in the battery cell stack 21 and the battery temperature thermistor 903 (as the temperature detection device 9) arranged in the battery cell stack 23 are arranged in line symmetry with respect to the battery cell stack arrangement direction.

As previously described, in order to decrease the total number of the temperature detection devices 9, i.e. the battery temperature thermistors, it is determined to arrange the battery temperature thermistors 900 to 905 as the temperature detection devices 9 at the optimum locations on the basis of the viewpoint in which the fluid circulation uniformly flows symmetrically with respect to the battery cell stack arrangement direction in the battery pack casing 3.

The battery management unit 4 monitors and receives the temperature information of the battery cell 2 in the battery cell stack 20 detected by and transmitted from the battery temperature thermistor 900. On the basis of the received temperature information transmitted from the battery temperature thermistor 900, the battery management unit 4 can estimate a temperature of the battery cell 2, which is closest to the side wall 35, arranged in the battery cell stack 22 and in line symmetry with respect to the battery cell 2 arranged in the battery cell stack 20 at which the battery temperature thermistor 900 is arranged.

Similarly, the battery management unit 4 monitors and receives the temperature information of the battery cell 2 arranged in the battery cell stack 22 detected by and transmitted from the battery temperature thermistor 901. On the basis of the received temperature information transmitted from the battery temperature thermistor 901, the battery management unit 4 can estimate a temperature of the battery cell 2 in the battery cell stack 20, which is closest to the side wall 34, arranged in line symmetry with respect to the battery cell 2 arranged in the battery cell stack 22 at which the battery temperature thermistor 901 is arranged.

This structure of the battery pack 1 makes it possible to decrease the total number of the temperature detection devices 9 in each of the battery cell stacks 20 and 22.

The battery management unit 4 compares the received temperature information transmitted from the battery temperature thermistor 900 arranged in the battery cell stack 20 with the received temperature information transmitted from the battery temperature thermistor 901 arranged in the battery cell stack 22, and obtains a temperature of each of the battery cells 2 which is most far from and closest to the fluid outlet passage 75 of the electric fan 6B, and a temperature difference on the basis of the received temperature information.

The battery management unit 4 stores the comparison result (as a temperature difference between the detected temperature values) into the memory section (not shown) regarding a temperature variability of the battery cells 2 in the battery cell stacks along the battery cell stacking direction in the battery pack casing 3.

Accordingly, the battery management unit 4 can monitor the variability of a temperature of the battery cells 2 in the battery cell stacks 20, 21, 22 and 23 along the battery cell stack arrangement direction in the battery pack casing 3 by using a smaller number of the temperature detection devices 9 when compared with the number of the temperature detection devices used in a conventional battery pack. The battery management unit 4 performs various countermeasures to the obtained temperature variability of the battery cells 2.

The judgment section 41 in the battery management unit 4 judges occurrence of an abnormal state which affects the output of the battery assembly 200 when the obtained temperature difference becomes reaches a value of not less than a predetermined value.

The battery management unit 4 instructs a display unit (not shown) to display information regarding the abnormal state of the battery assembly 200 or transmits the information to an external organization through a communication line. When receiving the information regarding the abnormal state of the battery assembly 200, the external organization informs the information regarding the abnormal state of the battery assembly 200 to a driver of an electric vehicle or a hybrid vehicle equipped with the battery pack 1 according to the first exemplary embodiment. For example, the external organization is an auto manufacturer of the vehicle or an automobile dealer which sold the vehicle.

The battery temperature thermistor 904 arranged in the battery cell stack 21 and the battery temperature thermistor 905 arranged in the battery cell stack 23 have the same action and effects of the battery temperature thermistor 900 and the battery temperature thermistor 901.

The battery management unit 4 receives temperature information detected by and transmitted from the battery temperature thermistor 902 arranged in the battery cell stack 21 and temperature information detected by and transmitted from the battery temperature thermistor 903 in the battery cell stack 23. The battery management unit 4 detects occurrence of an incorrect cooling condition of either of the battery cell stack 21 or the battery cell stack 23 on the basis of the received temperature information. For example, the judgment section 41 in the battery management unit 4 determines the occurrence of an abnormal state of the battery cell stack which would output an incorrect voltage when the received temperature information indicates a very lower or higher temperature of the battery cell. The battery management unit 4 instructs the display unit (not shown) to display the occurrence of the abnormal state of the battery assembly 200 or transmits the information regarding the occurrence of the abnormal state of the battery assembly 200 to the external organizations through the communication line previously described.

Further, the battery management unit 4 receives the temperature information detected by and transmitted from the battery temperature thermistor 902 arranged in the battery cell stack 21 and the temperature information detected by and transmitted from the battery temperature thermistor 903 arranged in the battery cell stack 23, and compares the temperature information of the battery temperature thermistor 902 with the temperature information of the battery temperature thermistor 903. On the basis of the comparison result, the battery management unit 4 judges that the fluid circulation flowing through one of the battery cell stacks 21 and 23 having a higher temperature has a low cooling ability.

For example, when judging that one of the battery cell stacks has a temperature which is higher than a predetermined temperature the judgment section 41 in the battery management unit 4 transmits the judgment result to the control section 42. When receiving the judgment result transmitted from the judgment section 41, the control section 42 increases a duty ratio in order to increase a voltage to be supplied to the electric motor 60 in the electric fan corresponding to the battery cell stack having a higher temperature. This control increases the flow amount of the fluid circulation of the electric fan and increases its cooling ability to cool the battery cell stack having a higher temperature.

A description will now be given of the action and effects of the battery pack 1 according to the first exemplary embodiment.

The battery pack 1 has the battery cell stacks 20, 21, 22 and 23, the battery pack casing 3 and the electric fans 6A and 6B. Each of the battery cell stacks 20, 21, 22 and 23 has a plurality of the battery cells 2 which are stacked along a specific direction, i.e. the battery cell stacking direction in the battery pack casing 3.

The electric fans 6A and 6B circulate the fluid circulation such as air circulation in the inside of the battery pack casing 3. The battery pack casing 3 accommodates the battery cell stacks 20, 21, 22 and 23 and the electric fans 6A and 6B.

Further, the battery pack 1 is equipped with the temperature detection devices 9 (for example, the battery temperature thermistors) and the battery management unit 4. At least one of the temperature detection devices 9 is arranged in each of the battery cell stacks 20, 21, 22 and 23 in order to detect a temperature of the battery cell 2 arranged at the specific location, i.e. the battery cell stacking direction. The battery management unit 4 receives the temperature information transmitted from the temperature detection devices 9. The temperature detection devices 9 are comprised of the four components, i.e. the battery temperature thermistor 900 arranged in the battery cell stack 20, the battery temperature thermistor 902 arranged in the battery cell stack 21, the battery temperature thermistor 901 arranged in the battery cell stack 22, and the battery temperature thermistor 903 arranged in the battery cell stack 23.

In the battery cell stacks 20, 21, 22 and 23, at least one of the temperature detection devices 9 (as the battery temperature thermistors) arranged in the battery cell stack 20 detects a temperature of the battery cell 2, arranged in the battery cell stack 20, which is different in the battery cell stacking direction from the battery cell 2 detected by the temperature detection device 9 arranged in the battery ell stack 22 (see FIG. 4).

In this structure of the battery pack 1, the temperature detection devices 9 arranged in each of the battery cell stacks 20 and 22 detect a temperature of the battery cells which are arranged at a different location in the battery cell stacking direction.

That is, the temperature detection devices 9 are arranged at asymmetric locations in the battery cell stacks 20 and 22 along the battery cell stacking direction. Accordingly, the battery cell 2, a temperature of which is detected by the temperature detection device 9 in the battery cell stack 20, is arranged at a specific location which is different in the battery cell stacking direction from a location of the battery cell 2 arranged in the battery cell stack 22.

Because the fluid circulation flows in the inside of the battery pack casing 3 in the battery pack 1 according to the first exemplary embodiment, it is possible for the battery management unit 4 to estimate a temperature of the battery cell 2 arranged in a first battery cell stack on the basis of a temperature of the battery cell 2 in a second battery cell stack, detected by the temperature detection device 9 belonging to the second battery cell stack, where these battery cells 2 are arranged in the first battery cell stack and the second battery cell stack, respectively at the same location along the battery cell stacking direction. That is, it is possible for the battery management unit 4 to use the temperature information of a first battery cell 2 detected by and transmitted from the temperature detection devices 9 in one battery cell stack in order to estimate a temperature of a second battery cell, which is not detected, arranged in another battery cell stack. This makes it possible to avoid the temperature detection device 9 being mounted to detect each of the battery cells 2 in the battery pack 1. In other words, the structure of the battery pack 1 previously described makes it possible to decrease the total number of the temperature detection devices 9 and estimate a temperature of the battery assembly 200 in the battery pack casing 3. It is possible for the battery management unit 4 to estimate a correct temperature distribution (or a temperature variation) of the battery cells 2 in the battery pack 1 even if the total number of the battery temperature thermistors is decreased.

Further, the battery management unit 4 can estimate a temperature of the battery cell 2 arranged at a specific location in another battery cell stack in the battery cell stacking direction, on the basis of the temperature information of the battery cell 2 obtained by and transmitted from the temperature detection device 9, which corresponds in location to the battery cell 2 arranged in the another battery cell stack. This structure makes it possible to perform the temperature management of the battery cells 2 in the battery pack 1 by using a smaller number of the temperature detection devices 9 when compared with the number of the temperature detection devices 9 which correspond to the battery cells 2, respectively.

Accordingly, it is possible to perform a simple temperature management of the battery cells 2 in the battery pack 1 with high efficiency, reduce the total number of the battery temperature thermistor, temperature detection wires, and other components. and reduce the total manufacturing steps and a manufacturing cost of producing the battery pack 1.

The fluid drive section 6 has the electric fans 6A and 6B capable of circulating the fluid into the battery cell stacks 21 and 23, respectively.

The battery management unit 4 compares the temperature information detected by the battery temperature thermistor 902 (as the temperature detection device 9) with the temperature information detected by the battery temperature thermistor 903 (as the temperature detection device 9).

The battery management unit 4 instructs the electric fan to increase the flow amount of the fluid circulation such as air to the battery cell stack, a temperature of which is higher than a temperature of another battery cell stack on the basis of the comparison result.

This control makes it possible to increase the cooling capability, for example, a flow amount of the fluid circulation and supply the fluid circulation to the battery cell stack having a higher temperature as compared with a temperature of another battery cell stack. Thus, the first exemplary embodiment provides the battery pack 1 having a smaller number of the temperature detection devices 9 and capable of preventing an output voltage drop of the battery assembly 200.

Furthermore, the temperature detection devices 9 are arranged at a different location in the pair of the battery cell stacks along the battery cell stacking direction in order for each of the temperature detection devices 9 to detect a temperature of the battery cell in one battery cell stack and a temperature of the battery cell arranged at the same location along the battery cell stacking direction in another battery cell stack.

The battery management unit 4 judges occurrence of an abnormal state of the battery cell stack on the basis of the temperature information obtained from both the temperature detection devices 9 which are arranged in the pair of the battery cell stacks.

This structure makes it possible to detect occurrence of the abnormal state of the battery cell stacks on the basis of the temperature information obtained by a smaller number of the temperature detection devices 9. Accordingly, it is possible to provide the battery pack 1 capable of detecting the abnormal state, for example, an incorrect output voltage and a reduced battery cooling capability of the fluid circulation in each of the battery cell stacks. It is further possible to reduce the components such as battery temperature thermistors, the temperature detection wires, and decrease the total number of manufacturing steps and a manufacturing cost of producing the battery pack 1. The first exemplary embodiment can provide the battery pack 1 capable of performing the battery temperature management with a simple structure.

In addition, the fluid circulation is generated and flows to circulate in the inside chamber of the battery pack casing 3, and the battery pack 1 having the improved structure uses the side walls, the ceiling wall, and the base wall as radiation members capable of cooling the fluid circulation flowing in the inside chamber of the battery pack casing 3. This structure makes it possible to promote the cooling capability to radiate heat energy generated by the battery cells 2 from the inside of the battery pack casing 3 to outside. It is thereby possible to make a radiation passage capable of discharging heat energy generated in the battery cells 2 to the outside of the battery pack casing 3 with high efficiency. In addition, because no new fluid such as exterior air and no dust are introduced into the inside chamber of the battery pack 1, no new condensation is generated in the inside chamber of the battery pack casing 3. Because the fluid is adequately stirred by the fluid circulation caused in the inside chamber of the battery pack casing 3 by the electric fans 6A and 6B, it is possible for the fluid circulation to enhance the capability to cool and/or heat the battery cells 2.

The circulation passage 7 has a specific passage section through which the fluid circulation is flowing while being in contact with at least one of the side walls (for example, the side wall 31, the side wall 32, the ceiling wall 30 and the base wall 33) in the plural wall surfaces which form the battery pack casing 3. This specific passage section in the circulation passage 7 is the side wall passage 71, the side wall passage 72, the ceiling wall passage 70 and the assembly passage 73, for example. This structure of the circulation passage 7 makes it possible to radiate the heat energy in the inside of the battery pack casing 3 to the outside through the ceiling wall 30 and the base wall 33 when the fluid circulation is flowing in the ceiling wall passage 70 and the assembly passage 73. Because at least one of the wall surfaces of the battery pack casing 3 is used as the radiation member capable of radiating heat energy in the inside chamber of the battery pack casing 3 to the outside, it is possible to have a large radiation area and radiate heat energy generated by the battery cells 2 to the outside of the battery pack 1 with high efficiency.

Still further, the circulation passage 7 gathers the fluid circulation passing through the battery cells 2 with high efficiency after absorbing heat energy generated in the battery cells 2 and carries the gathered fluid circulation into the inside of each of the electric fans 6A and 6B. The circulation passage 7 further makes a smooth flow having a low fluid resistance in the same direction to the electric fans 6A and 6B.

In addition, the battery cells 2 are arranged so that the electrode terminals of the battery cells 2 face the ceiling wall side. After passing around the electrode terminals of the battery cells 2, the fluid circulation from the electric fans 6A and 6B flows into the battery cell passage 76 formed between the adjacent battery cells 2. This flow rate of the fluid circulation makes it possible to cool the exterior casing of each of the battery cells 2 with high efficiency after cooling the electrode terminals of each of the battery cells 2. Because the electrode terminals of each of the battery cells 2 generate relatively high heat energy, the structure of the battery pack 1 according to the first exemplary embodiment can perform an effective cooling of the battery cells 2.

Second Exemplary Embodiment

A description will be given of a battery pack 1-1 according to a second exemplary embodiment with reference to FIG. 5.

Figure 5:
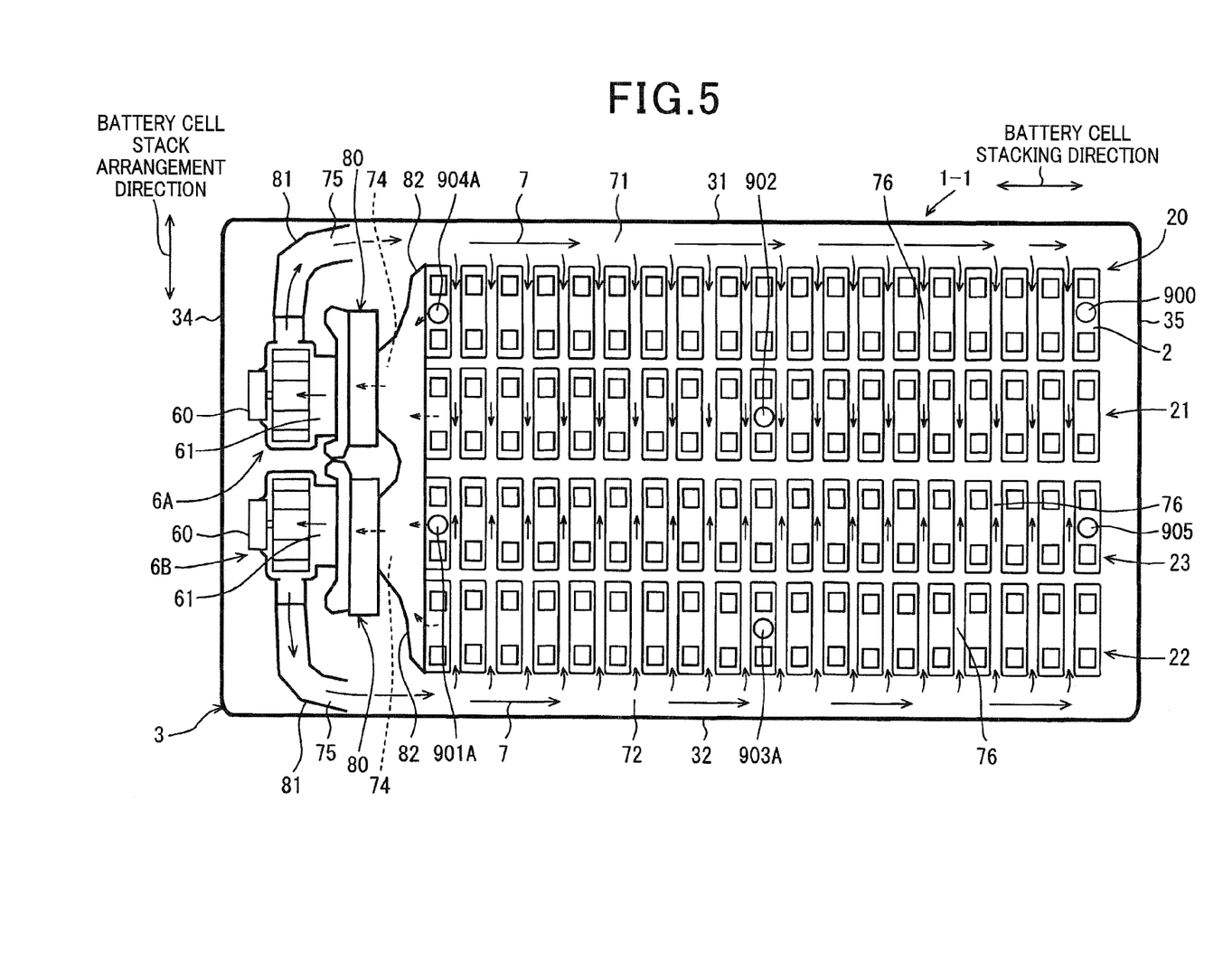
FIG. 5 is a view showing an inside structure viewed from the ceiling wall side of the battery pack casing and the fluid circulation flowing in the inside of the battery pack casing of the battery pack according to a second exemplary embodiment.

FIG. 5 is a view showing an inside structure viewed from the ceiling wall side of the battery pack casing 3 and the fluid circulation flowing in the inside of the battery pack casing 3 of the battery pack 1-1 according to the second exemplary embodiment.

The same components between the battery pack 1 according to the first exemplary embodiment shown in FIG. 4 and the battery pack 1-1 according to the second exemplary embodiment shown in FIG. 5 will be referred with the same reference numbers and characters. The explanation of the same components is omitted here for brevity. The difference between the battery pack 1-1 according to the second exemplary embodiment and the battery pack 1 according to the first exemplary embodiment will be explained.

As shown in FIG. 5, the battery pack 1-1 according to the second exemplary embodiment has the battery temperature thermistors 900, 901, 902 and 905 which are arranged at the same locations of the battery temperature thermistors 900, 901, 902 and 905 in the battery pack 1 according to the first exemplary embodiment.

In addition to these battery temperature thermistors 900, 901, 902 and 905, a battery temperature thermistor 903A is arranged at a central location in the battery cell stacking direction in the battery cell stack 22. A battery temperature thermistor 903A is arranged at a central location of the battery cell stack 22 in the battery cell stacking direction.

Further, a battery temperature thermistor 904A is arranged at a location in the battery cell stack 22 which is closest to the side wall 34 or the fluid outlet passage 75 of the electric fan 6A. Still further, a battery temperature thermistor 901A is arranged at a location in the battery cell stack 23 which is closest to the side wall 34 or the fluid outlet passage 75 of the electric fan 6B.

As shown in FIG. 5, the battery management unit 4 monitors and receives the temperature information transmitted from the battery temperature thermistor 904A arranged in the battery cell stack 20, and estimates on the basis of the received temperature information a temperature of the battery cell 2, which is arranged in the battery cell stack 22, closest to the side wall 34, and located in line symmetry with respect to the battery cell 2 arranged in the battery cell stack 20.

Similarly, the battery management unit 4 monitors and receives the temperature information transmitted from the battery temperature thermistor 901A arranged in the battery cell stack 23, and estimates on the basis of the received temperature information a temperature of the battery cell 2, which is arranged in the battery cell stack 21 and closest to the side wall 34.

Further, the battery management unit 4 monitors and receives the temperature information transmitted from the battery temperature thermistor 903A arranged in the battery cell stack 22, and estimates on the basis of the received temperature information a temperature of the battery cell 2 which is arranged at a central location in the battery cell stacking direction in the battery cell stack 20.

Still further, the battery management unit 4 monitors and receives the temperature information transmitted from the battery temperature thermistor 902 arranged in the battery cell stack 21, and estimates on the basis of the received temperature information a temperature of the battery cell 2 which is arranged at a central location in the battery cell stacking direction in the battery cell stack 23.

This makes it possible to decrease the total number of the temperature detection devices 9 in the battery cell stacks 20, 21, 22 and 23 in the battery pack 1-1 according to the second exemplary embodiment.

The battery management unit 4 compares the temperature information transmitted from the battery temperature thermistor 900 arranged in the battery cell stack 20 with the temperature information transmitted from the battery temperature thermistor 904A arranged in the battery cell stack 20, and obtains a temperature of each of the battery cell which is far from the fluid outlet passage 75 of the electric fan 6A and the battery cell which is more close to the fluid outlet passage 75 of the electric fan 6A. The battery management unit 4 stores the comparison result into the memory section (not shown) therein. The battery management unit 4 uses a temperature distribution of the battery cells arranged in the battery cell stacking direction on the basis of the comparison result as the temperature difference between these battery cells.

The battery management unit 4 can obtain a temperature distribution of the battery cells arranged in the battery cell stacking direction in each of the battery stack 23 by the same process previously described, i.e. on the basis of a comparison result between the temperature information transmitted from the battery temperature thermistor 905 and the battery temperature thermistor 901A.

Accordingly, the battery management unit 4 can monitor and obtain a temperature distribution (or a temperature variation) of the battery cells 2 arranged in the battery cell stacking direction by using a smaller number of the temperature detection devices 9 (for example, the battery temperature thermistors). The battery management unit 4 can provide various optimum countermeasures on the basis of the obtained temperature distribution of the battery cells 2.

Further, the battery management unit 4 determines that some abnormal state occurs in the battery assembly 200 when the temperature difference becomes not less than a predetermined value. For example, the battery assembly 200 outputs an incorrect voltage when the battery assembly 200 is fallen into the abnormal state. The battery management unit 4 instructs the display unit (not shown) to display the information regarding occurrence of the abnormal state to the external organization.

Third Exemplary Embodiment

A description will be given of a battery pack 1-2 according to a third exemplary embodiment with reference to FIG. 6.

Figure 6:
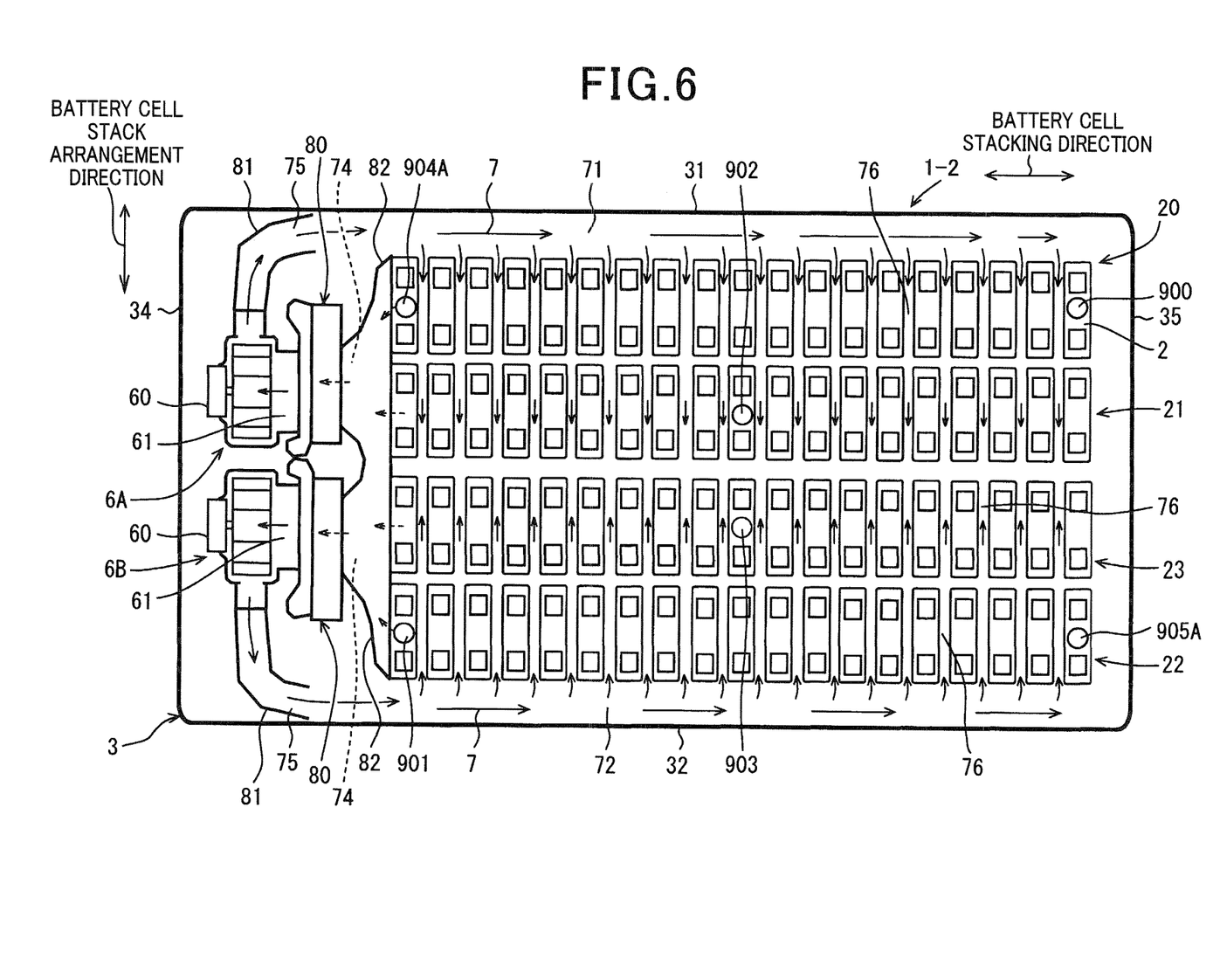
FIG. 6 is a view showing an inside structure viewed from the ceiling wall side of the battery pack casing and the fluid circulation flowing in the inside of the battery pack casing of the battery pack according to a third exemplary embodiment of the present invention.

FIG. 6 is a view showing an inside structure viewed from the ceiling wall side of the battery pack casing 3 and the fluid circulation flowing in the inside chamber of the battery pack casing 3 of the battery pack 1-2 according to the third exemplary embodiment.

The same components between the battery pack 1 according to the first exemplary embodiment shown in FIG. 4 and the battery pack 1-2 according to the third exemplary embodiment shown in FIG. 6 will be referred with the same reference numbers and characters. The explanation of the same components is omitted here for brevity.

A difference between the battery pack 1-2 according to the third exemplary embodiment and the battery pack 1 according to the first exemplary embodiment will be explained.

As shown in FIG. 6, the temperature detection devices 9 arranged in the battery cell stack 20 are located symmetrically with respect to the temperature detection devices 9 arranged in the battery cell stack 22. Specifically, the battery temperature thermistors 900 and 904A arranged in the battery cell stack 20 are located symmetrically with respect to the battery temperature thermistors 905A and 901 arranged in the battery cell stack 22 in the battery stack arrangement direction.

In addition, the battery temperature thermistor 902 arranged in the battery cell stack 21 is located symmetrically with respect to the battery temperature thermistor 903 arranged in the battery cell stack 23 in the battery stack arrangement direction.

The battery pack 1-2 according to the third exemplary embodiment basically has the same structure of the battery pack 1 according to the first exemplary embodiment. For example, at least one of the temperature detection devices 9 arranged in the battery cell stack 20 detects a temperature of the battery cell 2 and is arranged at a different location in the battery cell stacking direction with respect to the temperature detection devices 9 arranged in the battery cell stacks 21 and 23.

The battery pack 1-2 according to the third exemplary embodiment has a structure in which the temperature detection devices 9 are arranged in the battery cell stacks at locations symmetrically with respect to each other in a specific direction such as the battery cell stack arrangement direction in which the battery cell stacks are arranged.

In a pair of the battery cell stacks 20 and 21 and a pair of the battery cell stacks 22 and 23, the temperature detection devices 9 are arranged in the battery cell stacking direction in line symmetry between the battery cell stack 21 and the battery cell stack 23 with respect to each other.

According to the structure of the battery pack 1-2 of the third exemplary embodiment, the battery management unit 4 compares a temperature of the battery cell stack with a temperature of the battery cell stack arranged symmetrically with respect to each other, and detects occurrence of an abnormal state of the battery cell stack on the basis of the comparison result.

In addition, according to the structure of the battery pack 1-2 of the third exemplary embodiment, the battery management unit 4 can monitor and detect the battery cell 2 having a maximum temperature in the battery cells 2 on the basis of the received temperature information detected by and transmitted form the battery temperature thermistor 902 and the battery temperature thermistor 903. This structure makes it possible to securely detect occurrence of an abnormal state to output an incorrect voltage and quickly take an optimum countermeasure when the abnormal state occurs in the battery cell stack.

(Other Modifications)

The subject matter of the battery pack according to the present invention is not limited by the first to third exemplary embodiments previously described. For example, it is possible for the battery pack to have one of the two electric fans 6A and 6B capable of provide the fluid circulation such as air in the battery pack casing 3.

Although the battery pack according to the first to third exemplary embodiments has the four battery cell stacks 20, 21, 22 and 23. However, the present invention is not limited by this structure. It is possible for the battery pack to have one or more battery cell stacks.

In the structure of the battery pack according to the first to third exemplary embodiments previously described, the battery cell stacks are arranged in the inside chamber of the battery pack casing 3 which is completely sealed. That is, the battery pack casing 3 has a leak-proof structure and the inside fluid circulation is only circulated in the inside chamber of the battery pack casing 3 without introducing any external fresh air, for example. However, the present invention is not limited by this structure. For example, it is possible to use a battery pack casing equipped with a pressure valve which is opened when an inside pressure of the inside chamber of the battery pack casing exceeds a predetermined pressure value. In this case, the inside air of the battery pack casing is discharged outside when the inside pressure becomes not less than the predetermined pressure value. This structure makes it possible to prevent an unnecessary amount of air from being discharged and generation of noise when the inside air of the battery pack casing is discharged outside.

This pressure valve forms an open passage which communicates between the inside chamber of the battery pack casing and the outside air. When the inside pressure of the battery pack casing increases by some factors, the pressure valve opens and the inside air in the circulation passage 7 is discharged outside through the open passage. The open passage is formed by a through hole having a small diameter which penetrates the battery pack casing 3. A ring section having a small diameter is formed around the through hole. For example, the through hole having a small diameter prevents outside air from entering into the inside chamber of the battery pack casing, and allows the inside air as the fluid circulation is discharge from the inside chamber to outside. Accordingly, the inside chamber of the battery pack casing is sealed except for the through hole.

In the structure of the battery pack according to the first to third exemplary embodiments previously described, the assembly passage 73 is formed by the assembly duct 83. However, the present invention is not limited by this structure. For example, it is possible to use the base wall 33, the side wall 31 and the side wall 32 to form the assembly passage 73.

Further, it is possible for the fluid drive section 6 to use one of an axial fan, a turbo fan in addition to a sirocco fan as the electric fan.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A battery pack comprising:

a plurality of battery cell stacks, arranged in a battery cell stack arrangement direction, in each of the battery cell stacks, a plurality of battery cells are stacked in a battery cell stacked direction which is perpendicular to the battery cell stack arrangement direction;

a battery pack casing comprising an inside chamber configured to accommodate the battery cell stacks in the inside chamber, a fluid drive section configured to generate and circulate a fluid circulation in an inside chamber of the battery pack casing, the fluid circulation cooling or heating the battery cells;

first to fourth temperature detection devices configured to detect a temperature of the battery cells, the first and second temperature detection devices being arranged on the battery cells located at corner sections on a diagonal direction of the inside chamber of the battery pack casing, and the third and fourth temperature detection devices being arranged on the battery cells located at a central position in the inside chamber of the battery pack casing facing to each other in the battery cell stack arrangement direction; and a battery management section configured to receive temperature information detected by and transmitted from the temperature detection devices, wherein when a first battery cell stack and a second battery cell stack are selected from the plural battery cell stacks arranged in the battery cell stack arrangement direction, at least one of the temperature detection devices arranged on a battery cell in the first battery cell stack detects a temperature of a battery cell, on which no temperature detection device is arranged, in the second battery cell stack, the battery management section estimates a temperature of the battery cell located opposite, in the battery cell stack arrangement direction, to the battery cell on which the first temperature detection device is arranged on the basis of the received temperature information transmitted from the first temperature detection device, the battery management section estimates a temperature of the battery cell located opposite, in the battery cell stack arrangement direction, to the battery cell on which the second temperature detection device is arranged on the basis of the received temperature information transmitted from the second temperature detection device, and the battery management section judges occurrence of an abnormal state of the battery cell stacks on the basis of the temperature information transmitted from the first to fourth temperature detection devices.

2. The battery pack according to claim 1, wherein
the third and fourth temperature detection devices are arranged at a same location in the battery cell stacked direction,
the fluid drive section is equipped with electric fans capable of circulating the fluid circulation into each of the battery cell stacks, and
the battery management section receives and compares the temperature information transmitted from the first to fourth temperature detection devices, and instructs the fluid drive section to increase a flow amount of the fluid circulation to be supplied to the battery cell stacks having a high temperature on the basis of the comparison result.

3. The battery pack according to claim 1, wherein
the battery pack casing has a leak-proof structure and the fluid circulation is an air circulation which is only circulated in the inside chamber of the battery pack casing.

4. The battery pack according to claim 2, wherein
the battery pack casing has a leak-proof structure and the fluid circulation is an air circulation which is only circulated in the inside chamber of the battery pack casing.

5. The battery pack according to claim 1, wherein:
the battery cell, which is located opposite, in the battery cell stack arrangement direction, to the battery cell on which the second temperature detection device is arranged, is the battery cell which is closest to a fluid outlet passage of the fluid drive section.

6. The battery pack according to claim 1, wherein:
the first temperature detection device detects the temperature of a battery cell which is the most far from a fluid output passage of the fluid drive section; and
the second temperature detection device detects the temperature of a battery cell which is the closest to the fluid output passage of the fluid drive section.

7. The battery pack according to claim 6, wherein:
the battery management section determines a temperature difference based on the detected temperature of the battery cell which is the most far from the fluid output passage of the fluid drive section and the detected temperature of the battery cell which is the closest to the fluid output passage of the fluid drive section.

8. The battery pack according to claim 1, wherein:
the battery management section estimates a temperature distribution of plurality of battery cells at least based on:
the estimated temperature of the battery cell located opposite, in the battery cell stack arrangement direction, to the battery cell on which the first temperature detection device is arranged, and
the estimated temperature of the battery cell located opposite, in the battery cell stack arrangement direction, to the battery cell on which the second temperature detection device is arranged.

9. The battery pack according to claim 1, wherein:
the battery cell located opposite, in the battery cell stack arrangement direction, to the battery cell on which the first temperature detection device is arranged, is a battery cell which is closest to a first side wall of the battery pack casing;
the battery cell located opposite, in the battery cell stack arrangement direction, to the battery cell on which the second temperature detection device is arranged, is battery cell which is closest to a second side wall of the battery pack casing; and
the first and second side walls of the battery pack casing face each other.

* * * * *